(12) United States Patent
Liu et al.

(10) Patent No.: US 7,009,636 B2
(45) Date of Patent: Mar. 7, 2006

(54) PHOTOCURRENT ESTIMATION FROM MULTIPLE CAPTURES FOR SIMULTANEOUS SNR AND DYNAMIC RANGE IMPROVEMENT IN CMOS IMAGE SENSORS

(75) Inventors: Xinqiao Liu, Palo Alto, CA (US); Abbas El Gamal, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 712 days.

(21) Appl. No.: 09/992,479

(22) Filed: Nov. 13, 2001

(65) Prior Publication Data

US 2003/0098919 A1    May 29, 2003

(51) Int. Cl.
*H04N 3/14* (2006.01)
(52) U.S. Cl. .............................. 348/208.1; 348/208.4; 348/297
(58) Field of Classification Search ................ 348/241, 348/246, 229.1
See application file for complete search history.

(56) References Cited

U.S. PATENT DOCUMENTS

| | | | | |
|---|---|---|---|---|
| 5,272,535 A | 12/1993 | Elabd | ................ | 358/213.11 |
| 5,461,425 A | 10/1995 | Fowler et al. | ................ | 348/294 |
| 5,583,367 A | 12/1996 | Blossfeld | ................ | 257/426 |
| 5,600,731 A * | 2/1997 | Sezan et al. | ................ | 382/107 |
| 5,742,047 A | 4/1998 | Buhler et al. | ................ | 250/214 |
| 5,801,657 A | 9/1998 | Fowler et al. | ................ | 341/155 |
| 5,841,126 A | 11/1998 | Fossum et al. | ................ | 250/208.1 |
| 5,900,623 A | 5/1999 | Tsang et al. | ................ | 250/208 |
| 5,905,533 A * | 5/1999 | Hidari | ................ | 348/363 |
| 5,969,758 A | 10/1999 | Sauer et al. | ................ | 348/241 |
| 6,078,037 A | 6/2000 | Booth, Jr. | ................ | 250/208.1 |
| 6,130,423 A | 10/2000 | Brehmer et al. | ................ | 250/208.1 |
| 6,157,016 A | 12/2000 | Clark et al. | ................ | 250/208.1 |
| 6,298,144 B1 * | 10/2001 | Pucker et al. | ................ | 382/103 |
| 2002/0012056 A1 * | 1/2002 | Trevino et al. | ................ | 348/304 |

FOREIGN PATENT DOCUMENTS

JP    63-201406    *    2/1990

OTHER PUBLICATIONS

A. Krymski et al.; "A high speed, 500 frames/s, 1024 X 1024 CMOS active pixel sensor;" Proceeding of the 1999 Symposium on VLSI Circuits, pp. 137-138, Jun. 1999.
N. stevanovic et al.; "A CMOS image sensor for high speed imaging;" Digest of Technical papers of the 2000 IEEE International Solid-State Circuits Conference, pp. 104-105, Feb. 2000.

(Continued)

*Primary Examiner*—David Ometz
*Assistant Examiner*—Anthony J. Daniels
(74) *Attorney, Agent, or Firm*—Lumen Intellectual Property Services, Inc.

(57) ABSTRACT

The dynamic range and the noise immunity of a digital imaging system are increased by basing an estimate of the illumination on a sensor on a series of measurements of the accumulated illumination at intervals within an exposure period. The measuring may occur destructively, or alternatively the photocurrent of the sensor may continue to accumulate over the exposure period. The estimate may use statistical signal processing of the measurements, based on various noise models and various optimization criteria. The estimate may be computed recursively over the multiplicity of measurements, using a set of recursive values that may include but is not limited to the estimated illumination, a current weighting coefficient, a variance of the current measurement and a variance over the series of measurements.

30 Claims, 11 Drawing Sheets

OTHER PUBLICATIONS

R. L. Lagendijk et al.; "Maximum likelihood image and blur identification: a unifying approach;" Opt. Eng., vol. 29, No. 5, pp. 422-435, May 1990.

Hon-Sum Wong; "Technology and device scaling considerations for CMOS imagers;" IEEE Transactions on Electron Device, vol. 43, No. 12, Dec. 1996.

D. Yang et al.; "Comparative analysis of SNR for image sensors with enhanced dynamic range;" SPIE, EL 1999.

E. R. Fossum; "CMOS image sensors: electronic camera-on-chip;" IEEE Transactions on Electron Device, vol. 44, No. 10, Oct. 1996.

S. Kleinfelder et al.; "A 10K frames/s 0.18βM CMOS digital pixel sensor with pixel-level memory;" Digest of Technical Papers of the 2001 IEEE International Solid-State Circuits Conference, pp. 88-99. Feb., 2001.

D. Kundur et al., "Blind image deconvolution;" IEEE Signal Processing Magazine, vol. 13 No. 5, pp. 43-64, May 1996.

M. R. Banham; "Digital image restoration;" IEEE Signal Processing Magazine, vol. 14 No. 2, pp. 24-41, Mar. 1997.

N. Stevanovic et al.; "A CMOS image sensor for high speed imaging;" ISSCC Dig. Tech. Papers, pp. 104-105, Feb. 2000.

S. Kleinfelder et al.; "A 10,000 frames/s 0.18βM CMOS digital pixel sensor with pixel-level memory;" ISSCC Dig. Tech. Papers, Feb. 2001.

O. Yadid-Pecht; "Wide intrascene dynamic range CMOS APS using dual sampling;" IEEE Trans. on Electron Devices, vol. 44 No. 10, pp. 1721-1723, Oct. 1997.

D. Yang; et al.; "A 640 X 512 CMOS image sensor with ultra-wide dynamic range floating-point pixel level ADC;" IEEE J. Solid-State Circuits, vol. 34, No. 12, pp. 1821-1834, Dec. 1999.

D. Yang et al.; "Comparative analysis of SNR for image sensors with enhanced dynamic range;" Proceedings of the SPIE, vol. 3649, San Jose, CA, Jan. 1999.

A. El. Gamal et al.; "Pixel level processing why?, what?, and how?" Proceedings of the SPIE, vol. 3650, pp. 2-13, Jan. 1999.

S. H. Lim et al.; "Integration of image capture and processing-beyond single chip digital camera;" Proceedings of the SPIE, vol. 4306, Mar., 2001.

X. Liu et al.; "Photocurrent estimation from multiple non-destructive samples in a CMOS image sensor;" Proc. of SPIE, vol. 4306, Mar., 2001.

S. J. Decker; "A 256X256 CMOS imaging array with wide dynamic range pixels and column-parallel digital output;" IEEE Journal of Solid State Icrcuits, vol. 33, pp. 2081-1091, Dec., 1998.

* cited by examiner (a)

(b)

(c)

(d)

(a)　(b)　(c)　(d)

PHOTOCURRENT ESTIMATION FROM MULTIPLE CAPTURES FOR SIMULTANEOUS SNR AND DYNAMIC RANGE IMPROVEMENT IN CMOS IMAGE SENSORS

CROSS-REFERENCES TO RELATED APPLICATIONS

This application relates to a co-pending U.S. patent application Ser. No. 09/992,480, filed Nov. 13, 2001, and entitled, "Motion/Saturation Detection System and Method for Synthesizing High Dynamic Range Motion Blur Free Images from Multiple Captures", which is hereby incorporated herein by reference.

This application relates to U.S. patent application Ser. No. 09/962,804, titled "CMOS Image Sensor System with Self-Reset Digital Pixel Architecture for Improving SNR and Dynamic Range", and Ser. No. 09/962,847, titled "Method for Improving SNR in Low Illumination Conditions in a CMOS Video Sensor System Using a Self-Resetting Digital Pixel", both of which were filed on Sep. 24, 2001, are assigned to the same assignee as the present application, and are hereby incorporated herein by reference.

BACKGROUND OF THE INVENTION

1. Field of the Invention

The present invention relates generally to photocurrent estimation and, more particularly, to photocurrent estimation from multiple captures for simultaneously improving signal-to-noise ratio (SNR) and dynamic range in complementary metal oxide semiconductor (CMOS) image sensor systems.

2. Description of the Related Art

An image sensor converts an optical image focused on the sensor into electrical signals. The electrical signals represent the intensity of the image. It is important that the image sensor be usable under a variety of lighting conditions because the wider the variety of lighting conditions under which the image sensor is usable the better the image quality. Consequently, the quality of an imaging system is commonly measured by the image sensor's dynamic range and its ability to mask noises, i.e., its SNR, under low light conditions.

The dynamic range of an image sensor measures how wide a range of lighting the sensor can accurately capture. For example, a scene including both a tree lit by bright sunlight and a person standing under the tree has a high dynamic range. This high dynamic range makes it difficult for the image sensor, such as one used in a camera, a video recorder, or a security monitor, to capture details of both the brightly lit tree and the person standing in the tree's shadow.

The wider the dynamic range of the image sensor, the more details can be shown under extreme conditions and thus the more versatile the associated imaging system becomes. For example, with a wide dynamic range, a novice or an inexperienced imaging system user can take great pictures or videos without worrying much about lighting conditions and/or corresponding settings. Even an advanced or experienced user is likely to enjoy the convenience and advantages of a wide dynamic range imaging system.

The SNR of an image sensor measures the ratio between the signal and its associated noise. An image sensor with low SNR will have an objectionable amount of static-like or grain-like noise appearing in the captured image, while an image sensor with high SNR can be used under low lighting conditions, such as in a room lit only by candlelight. Clearly, an ideal imaging system would desirably have a high SNR as well as a wide dynamic range.

Another desirable feature of an ideal imaging system is the prevention/elimination of motion blur, allowing a quality image to be captured from a moving subject. In the case of a camera, motion blur may be controlled by shutter speed. However, the effectiveness of this technique is dependent upon illumination level. As such, a highly desirable imaging system would be one that is capable of automatically adjusting itself in order to compensate a wide range of illumination levels and one that produces noise free and motion blur free high quality images even when the subject may be moving fast and/or unexpectedly. Virtually all imaging systems and image sensing devices can benefit from utilizing image sensors that offer wider dynamic range, higher SNR, and motion blur free images.

Most of today's imaging systems and image sensing devices such as video and digital cameras use charge-coupled device (CCD) image sensors. In CCD image sensors, the electric charge collected by the photo detector array during exposure time is serially shifted out of the sensor chip, resulting in slow readout speed and high power consumption. Furthermore, since CCDs are fabricated in a non-standard technology, other analog and digital camera functions such as A/D conversion, image processing and compression, control and storage cannot be integrated with the sensor on the same chip and must be implemented using several other chips. Such implementation can be quite expensive because of the specialized processing involved for CCDs.

CCD image sensors are well known in the art and thus are not described herein. An exemplary teaching can be found in U.S. Pat. No. 5,272,535, which is incorporated herein by reference, titled "Image Sensor with Exposure Control, Selectable Interlaced, Pseudo Interlaced or Non-Interlaced Readout and Video Compression", issued to Elabd of Sunnyvale, Calif., and assigned to Loral Fairchild Corporation, Syosset, N.Y., December 1993.

The CMOS technology provides the possibility of integrating image sensing and digital signal processing on the same chip, resulting faster, smaller, less expensive, and lower power image sensing devices. The advantages of CMOS image sensors over CCD image sensors are well known. An exemplary teaching, which is incorporated herein by reference, can be found in Wong's "Technology and Device Scaling Considerations for CMOS Imagers".

Recently developed CMOS image sensors are read out non-destructively and in a manner similar to a digital memory and can thus be operated at very high frame rates. Several high speed CMOS Active Pixel Sensors have been recently reported. In "A High Speed, 500 Frames/s, 1024×1024 CMOS Active Pixel Sensor", Krymski et al. describe a 1024×1024 CMOS image sensor that achieves 500 frames per a second. Stevanovic et al. describe in "A CMOS Image Sensor for High Speed Imaging" a 256×256 sensor achieving 1000 frames per a second. In "A 10,000 Frames/s 0.18 $\mu$m CMOS Digital Pixel Sensor with Pixel-Level Memory", Kleinfelder et al. describe a 352×288 CMOS Digital Pixel Sensor achieving 10,000 frames per a second.

Unlike CCD image sensors, a CMOS image sensor can be integrated with other camera functions on the same chip ultimately leading to a single-chip digital camera with very small size, low power consumption and additional functionality. The integration of processing and image capture coupled with high frame rate capability of CMOS image sensors enable efficient implementations of many still and standard video imaging applications. A drawback, however, is that CMOS image sensors generally suffer from lower dynamic range and SNR than CCDs due to their high readout noise and non-uniformity.

It has been proposed to enhance dynamic range via multiple image captures (multiple sampling). The idea is to capture several images at different times within the normal exposure time—shorter exposure time images capture the brighter areas of the scene while longer exposure time images capture the darker areas of the scene. (In video imaging applications, the video frame rate sets an upper bound on the exposure time. In digital still photography, the maximum exposure time is limited by possible motion of the digital camera, possible motion of the subject, and saturation of the sensors.) A high dynamic range image is then synthesized from the multiple captures by appropriately scaling each pixel's last sample before saturation.

In "Comparative Analysis of SNR for Image Sensors with Enhanced Dynamic Range", which is hereby incorporated herein by reference, Yang et al. show that this scheme achieves higher SNR than other dynamic range enhancement implementations. However, this scheme does not take full advantage of the captured images. Since readout noise is not reduced, dynamic range is only extended at the high illumination end. Furthermore, according to this prior art scheme, although dynamic range can be extended at the low illumination end by increasing exposure time, such increase in exposure time results in unacceptable blur due to motion or change of illumination.

BRIEF SUMMARY OF THE INVENTION

Accordingly, it is a primary object of the present invention to provide a novel dynamic range enhancement that overcomes weaknesses and drawbacks of prior art dynamic range enhancement schemes.

It is an object of the present invention to provide novel apparatuses, systems, and methods for synthesizing high dynamic range, motion blur free images from multiple captures in a CMOS image sensor system.

It is another object of the present invention to provide photocurrent estimation systems and methods for estimating photocurrent from multiple captures, the inventive photocurrent estimation systems and methods improving both the SNR and dynamic range in a CMOS image sensor even under low illumination.

It is yet another object of the present invention to provide motion/saturation detection systems and methods for improving the SNR and enhancing the dynamic range in a CMOS image sensor system while ensuring the integrity of the inventive photocurrent estimation, the motion/saturation detection updates the photocurrent estimation in accordance with a determination whether motion blur/saturation has occurred.

It is a further object of the present invention to provide imaging system and apparatuses capable of generating high quality images without motion blur and/or noise even at high speed, with longer exposure time beyond standard, and/or under low illumination.

It is another object of the present invention to anticipate easy, fast, simple, efficient and economical implementations of the inventive algorithms. The algorithms operate completely locally, i.e., each image pixel's final value is computed using only its captured values, and recursively, thereby requiring only a small constant number of values per pixel be stored, the constant number being independent to the number of images captured.

It is therefore a further object of the present invention to implement the inventive algorithms on a single chip digital camera with increased SNR and enhanced dynamic range, the digital camera capable of capturing multiple samples in an exposure time and generating high quality images without motion blur even under low illumination.

Still further objects and advantages of the present invention will become apparent to one of ordinary skill in the art upon reading and understanding the following drawings and detailed description of the preferred embodiments. As it will be appreciated by one of ordinary skill in the art, the present invention may take various forms and may comprise various components and steps and arrangements thereof. Accordingly, the drawings are for purposes of illustrating a preferred embodiment(s) of the present invention and are not to be construed as limiting the present invention.

DETAILED DESCRIPTION OF THE INVENTION

CMOS image sensors are known to be capable of non-destructive readout at very high frame rate. This high speed image readout capability, which makes it possible to capture multiple images within a normal exposure time, and the potential of integrating memory and signal processing with the image sensor on the same chip enable the implementation of many new imaging applications.

Prior implementations have demonstrated the use of this capability to enhance the image sensor dynamic range. The idea is to capture several frames during a normal exposure time and combine them into one single dynamic range image. These prior implementations, however, do not reduce read noise and thus only enhance the image sensor's dynamic range at the high illumination end. For example, as described herein, it has been proposed to simply scale each pixel's last sample before saturation for the synthesis. However, because read noise is not reduced, this prior art method only increases dynamic range at high illumination end and it suffers from potential motion blur.

Overcoming the weaknesses and drawbacks of prior art teachings, the present invention provides novel apparatuses, systems and methods for synthesizing a high dynamic range image from multiple captures while avoiding motion blur. An image sensor model with which the present invention may be integrated will first be described and various embodiments will next be described herein.

An Image Sensor Model

Figure 1:
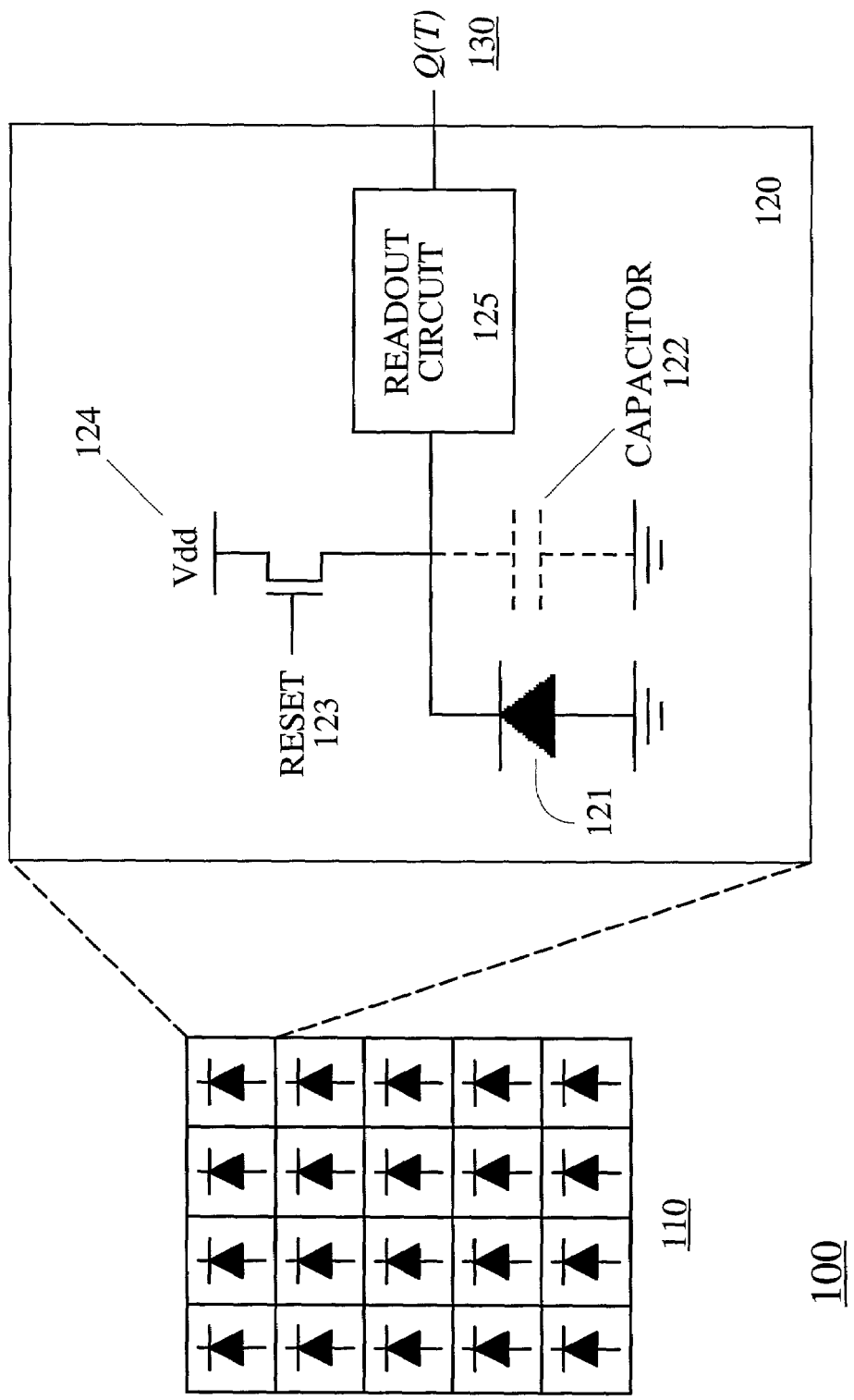
FIG. 1 is a schematic representation of an image sensor model that can be implemented to benefit from embodiments of the present invention.

As shown in FIG. 1, a typical image sensor 100 used in an analog or digital camera generally consists of a two dimensional (2D) array of pixels 110. Each pixel 120 may include a photodiode 121, a reset transistor 123, and several other readout transistors in readout circuit 125. The photodiode is reset before the beginning of capture. During capture, each pixel converts incident light into photocurrent $i_{ph}(t)$, for $0 \leq t \leq T$, where T is the exposure time. This process is quite linear and thus $i_{ph}(t)$ is a good measure of incident light intensity.

Since the photocurrent is too small to measure directly, it is integrated onto the photodiode parasitic capacitor 122 and the charge (or voltage) Q(T) 130 is read out at the end of exposure time T. Dark current $i_{dc}$ and additive noise corrupt the output signal charge. The noise can be expressed as sum of following three independent components:

Shot noise U(T), which is normalized (zero mean) Poisson distributed. Here the photocurrent is assumed to be large enough and thus shot noise can be approximated by a Gaussian $$U(T) \sim N\left(0, q \int_0^T (i_{ph}(t) + i_{dc}) dt\right),$$

where q is the electron charge.

Reset noise (including offset fixed pattern noise (FPN)) $C \sim N(0, \sigma_C^2)$.

Readout circuit noise V(T) (including quantization noise) with zero mean and variance $\sigma_V^2$.

Thus, the output charge from a pixel can be expressed as $$Q(T) = \int_0^T (i_{ph}(t) + i_{dc}) dt + U(T) + V(T) + C, \quad (1)$$

provided $Q(T) \leq Q_{sat}$, the saturation charge, also referred to as well capacity. If photocurrent is constant over exposure time, signal-to-noise ratio (SNR) is given by $$SNR(i_{ph}) = 20 \log_{10} \frac{i_{ph} T}{\sqrt{q(i_{ph} + i_{dc})T + \sigma_V^2 + \sigma_C^2}}. \quad (2)$$

Note that SNR increases with $i_{ph}$, first at 20 dB per decade when reset and readout noise variance dominates, and then at 10 dB per decade when shot noise variance dominates. SNR also increases with T. Thus it is always preferred to have the longest possible exposure time. Saturation and change in photocurrent due to motion, however, makes it impractical to make exposure time too long.

Dynamic range is a critical figure of merit for image sensors. It is defined as the ratio of the largest non-saturating photocurrent $i_{max}$ to the smallest detectable photocurrent $i_{min}$, typically defined as the standard deviation of the noise under dark conditions. Using the sensor model, dynamic range can be expressed as $$DR = 20 \log_{10} \frac{i_{max}}{i_{min}} = 20 \log_{10} \frac{Q_{sat} - i_{dc} T}{\sqrt{q i_{dc} T + \sigma_V^2 + \sigma_C^2}}. \quad (3)$$

Note that dynamic range decreases as exposure time increases due to the adverse effects of dark current. To increase dynamic range, one needs to either increase well capacity $Q_{sat}$, and/or decrease read noise $\sigma_V^2$. Prior art methods for enhancing sensor dynamic range have focused on effectively increasing well capacity by reducing exposure time T, which only increases dynamic range at the high illumination end. The present invention provides increased dynamic range and reduced read noise even at the low illumination end.

High Dynamic Range Image Synthesis

Figure 2:
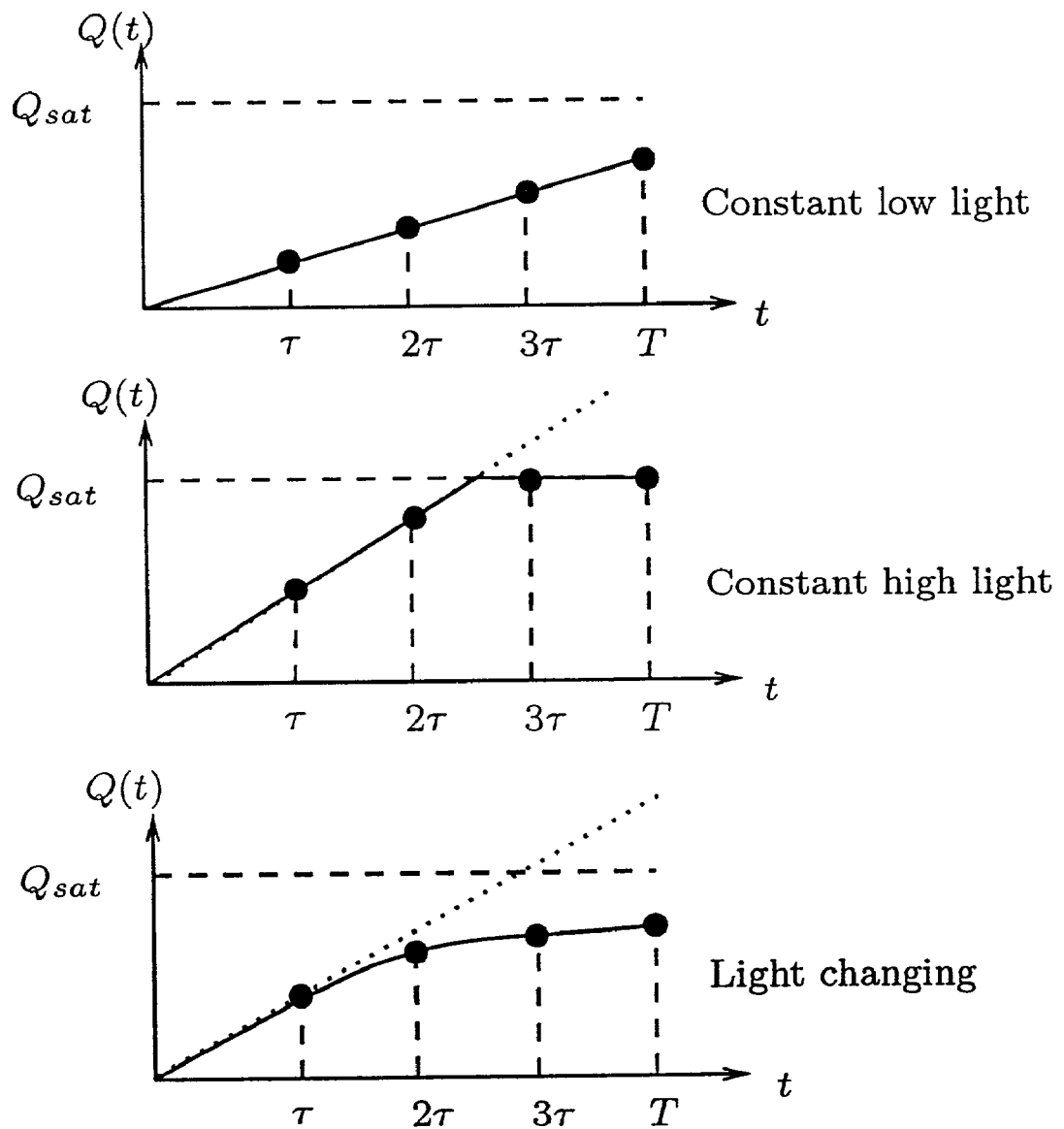
FIG. 2 shows electric charge vs. time for pixel under three lighting conditions.

Referring now to FIG. 2 where the effect of three different lighting conditions with respect to photocurrent estimation is illustrated. As shown in the top plot of FIG. 2, under a constant low light, the photocurrent can be well estimated from Q(T). In a case of a constant high light, as shown in the middle plot of FIG. 2, where $Q(T)=Q_{sat}$, the photocurrent cannot be well estimated from Q(T). The bottom plot of FIG. 2 shows that the lighting condition changes during exposure time, e.g., due to motion. In this case, photocurrent at the beginning of exposure time $i_{ph}(0)$ again cannot be well estimated from Q(T).

To avoid saturation and the change of $i_{ph}(t)$ due to motion, exposure time may be shortened, e.g., to τ in FIG. 2. Since in conventional sensor operation, exposure time is set globally for all pixels, this results in reduction of SNR, i.e., much noisier, especially for pixels under low light.

Figure 3:
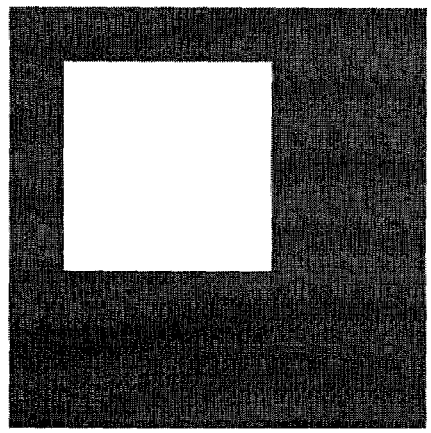
FIG. 3 shows (a) a scene where a bright square object moving diagonally across still dark background; (b) the final image generated with long exposure time; (c) the final image generated with short exposure time; and (d) the final image generated in accordance with an embodiment of the present invention.
Figure 3:
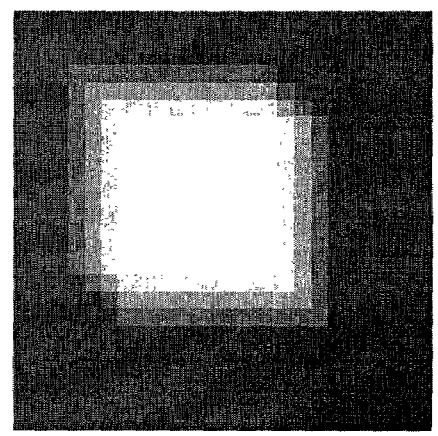
Figure 3:
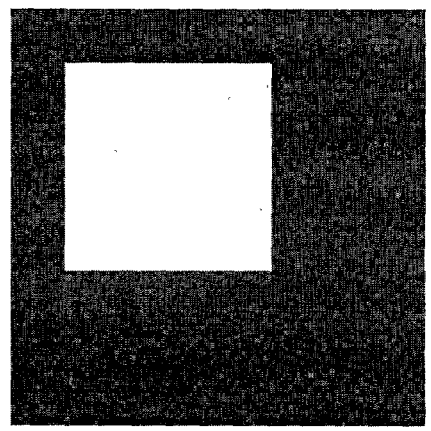
Figure 3:
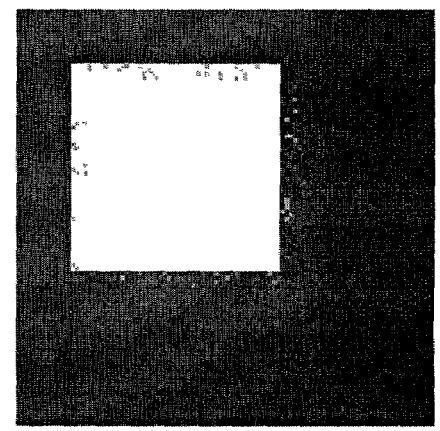

Such weakness of conventional pixel operation is further demonstrated in FIG. 3 where a bright square object moves diagonally across a dark background. Ideally, an image captured during such movement should be free of noise and motion blur as shown in (a). In conventional pixel operation, however, setting long exposure time achieves high SNR (less noise) but results in significant motion blur as shown in (b). On the other hand, if exposure time is set short to reduce motion blur, SNR deteriorates resulting in noisy image as shown in (c). As shown in (d), image captured according to the principles of the present invention does not suffer from motion blur, as in (b), or noise, as in (c), and is substantially close to ideal, as in (a). The present invention disclosed herein clearly and advantageously overcomes the shortcomings of the conventional pixel operation.

With recent advances in CMOS image sensor technology, it is now possible to capture and nondestructively read out, i.e., without resetting, several images within a normal exposure time. As such, pixel exposure time can be "adapted" to its lighting condition so that pixels with high light have short exposure times while pixels with low light have long exposure times. For example, referring to FIG. 2, if four images are captured at $\tau$, $2\tau$, $3\tau$, and $T=4\tau$, the photocurrent for the high light pixel can be estimated using the images captured at $\tau$ and $2\tau$, while for the low light pixel it can be estimated using the four images. Motion blur in the third case can be reduced by using the first capture only to estimate photocurrent at the beginning of exposure time $i_{ph}(0)$.

Prior art studies have shown that it is possible to estimate photocurrent at the beginning of exposure time using captured image. Yang et al. disclose an estimation method in "A 640×512 CMOS image sensor with ultra-wide dynamic range floating-point pixel level ADC" in which a last sample before saturation is used to estimate photocurrent. This estimation method, however, does not address motion blur. Accordingly, this method produces images similar to one that is shown in (b) of FIG. 3. The novel photocurrent estimation algorithms described herein employ all samples before saturation and produce almost blur free and less noisy images such as one that is shown in (d) of FIG. 3.

Figure 4:
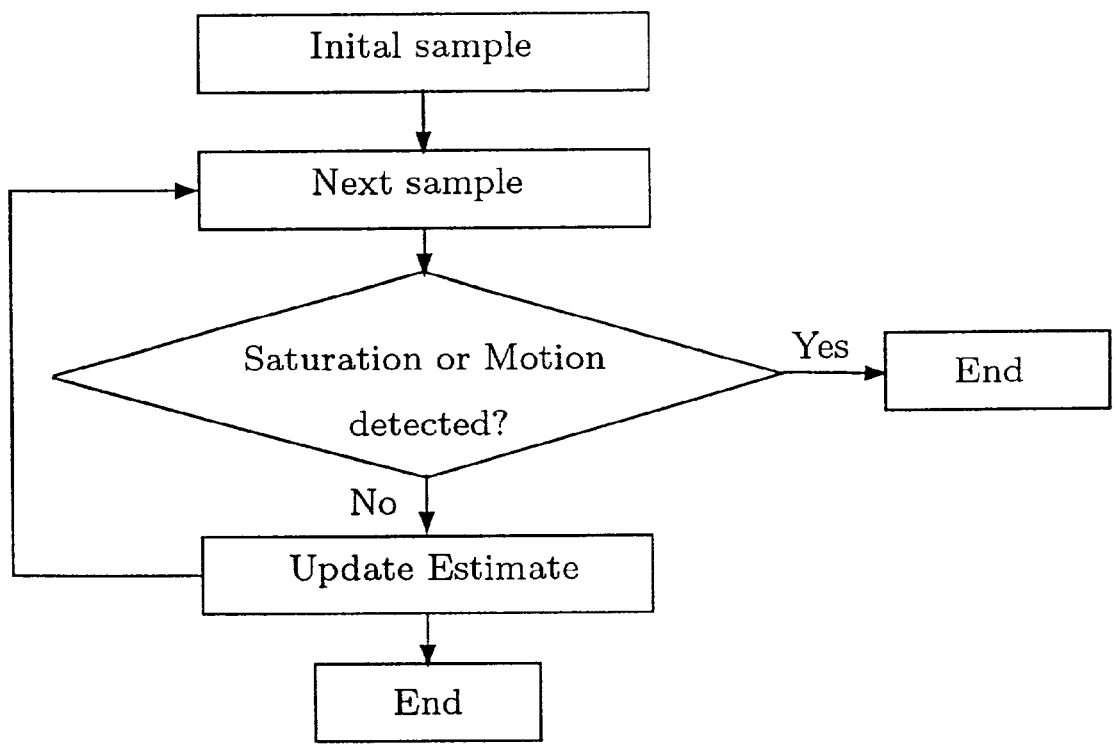
FIG. 4 is a high level flow chart showing high dynamic range, motion blur free synthesis from multiple captures according to another embodiment of the present invention.

Referring now to FIG. 4, wherein a high level flow chart of a high dynamic range, motion blur free image synthesis with multiple captures utilizing the novel estimation and motion/saturation detection algorithms according to the present invention is provided. The image synthesis algorithm according to the present invention essentially operates on n images captured at times $\tau$, $2\tau$, ..., $n\tau=T$ as follows:
1. Capture a first image, set k=1;
2. Estimate, for each pixel, photocurrent $\hat{I}_k$ from $Q(\tau)$;
3. Capture next image;
4. Determine, for each pixel, whether motion/saturation has occurred.
5. Repeat steps 3 and 4 until k=n.

In step 4, if motion is detected, set final photocurrent estimate: $\hat{I}_n=\hat{I}_k$. On the other hand, if no motion is detected, or if a decision is deferred, the system finds a current estimate $\hat{I}_{k+1}$ from $Q((k+1)\tau)$ and $\hat{I}_k$ and set k=k+1.

Note this image synthesis algorithm actually operates on n+1 images. The first image, which is ignored here, is taken at t=0 and is used to reduce reset noise and offset FPN as discussed in detail herein.

Photocurrent Estimation

Dynamic range at the low illumination end can be enhanced using multiple captures by appropriately averaging each pixel's photocurrent samples to reduce readout noise. Since the sensor noise depends on the signal and the photocurrent samples are dependent, equal weight averaging may not reduce readout noise and can in fact be worse than simply using the last sample before saturation to estimate photocurrent. The present inventive estimation system avoids this potential pitfall by utilizing linear mean square estimation (MSE) to derive optimal weights used in the averaging process. Furthermore, the present invention provides means for determining whether to include the last sample before saturation/motion in the estimation.

To maximize the likelihood of finding the best and most unbiased estimate and achieve the smallest probability of error, the present invention provides estimation solutions for the following three scenarios:

(1) when reset noise and offset FPN are ignored;
(2) when reset noise and FPN are considered; and
(3) when reset noise as well as FPN are considered without the need to store all the samples (a recursive solution).

These scenarios can be formulated as follows. Assume n+1 pixel charge samples $Q_k$ are captured at times 0, $\tau$, $2\tau$, ..., $n\tau=T$. Define the pixel current $i=i_{ph}+i_{dc}$. The kth charge sample is thus given by $$Q_k = ik\tau + \sum_{j=1}^{k} U_j + V_k + C, \text{ for } 0 \leq k \leq n,$$

where $V_k$ is the readout noise of the kth sample, $U_j$ is the shot noise generated during the time interval $((j-1)\tau, j\tau)$, and C is the reset noise. The $U_j$'s, $V_k$, and C are independent zero mean random variables with $E(V_k^2)=\sigma_V^2>0$, for $0 \leq k \leq n$, $E(U_j^2)=\sigma_U^2=qi\tau$, for $1 \leq j \leq k$, and $E(C^2)=\sigma_C^2$.

Ideally, the signal i is estimated from n+1 samples. Due to motion and/or saturation, however, the estimation may not use all n+1 samples. Note estimation parameters can be formulated using several criteria, such as likelihood ratio and mean square error. As is known in the art, maximum likelihood estimation achieves the smallest probability of error, but is generally difficult to derive and may lead to non-linear solutions that are not easy to implement in practice. An exemplary teaching, which is hereby incorporated herein by reference, on the principles and problems related to parameter estimation can be found in "Parameter Estimation, Principles and Problems" by H. Sorenson. Accordingly, the present invention focuses on linear minimum mean square estimation (MMSE).

A preferred goal of the present invention is to find, at time $k\tau$, the best unbiased linear mean square estimate $\hat{I}_k$ of the parameter I, given $\{Q_0, Q_1, \ldots, Q_k\}$, i.e., find coefficients $b_0^{(k)}, b_1^{(k)}, \ldots, b_k^{(k)}$ such that $$\hat{I}_k = \sum_{j=0}^{k} b_j^{(k)} Q_j, \quad (4)$$

minimizes mean square error (MSE) $\Phi_k^2=E(\hat{I}_k-i)^2$, subject to a linear constraint $E(\hat{I}_k)=i$ where superscript (k) represents number of captures used while subscript k serves as index of the coefficients for each capture.

Having stated the preferred goal, estimation solutions for the three scenarios will now be described. For exhaustive details on respective mathematical models and corresponding calculations, readers are referred to Applicants' publication, "Photocurrent Estimation from Multiple Non-Destructive Samples in a CMOS Image Sensor", Proc. of SPIE, Vol. 4306, March 2001, the publication of which is hereby expressly incorporated herein by reference in its entirety.

Estimation for Scenario (1)—A Recursive Solution

Ignoring reset noise and offset FPN, i.e., setting C=0, although not realistic for CMOS sensors, is reasonable for high-end CCD's with very high resolution analog to digital converter (ADC). With this reasonable assumption, optimal estimate can be formed in a recursive manner, which is not the case when reset noise is considered. To derive the best estimate, the pixel current samples is defined as $$\tilde{I}_k = \frac{Q_k}{k\tau} = i + \frac{\sum_{j=1}^{k} U_j}{k\tau} + \frac{V_k}{k\tau}, \text{ for } 1 \le k \le n.$$

That is, given samples $\{\tilde{I}_1, \tilde{I}_2, \ldots, \tilde{I}_k\}$, the goal is to find the best unbiased linear estimate $\hat{I}_k$ of the parameter i, i.e., weights $a_1^{(k)}, a_2^{(k)}, \ldots, a_k^{(k)}$, such that $$\hat{I}_k = \sum_{j=1}^{k} a_j^{(k)} \tilde{I}_j, \quad (5)$$

that minimizes mean square error (MSE) $\Phi_k^2 = E(\hat{I}_k - i)^2$, subject to a linear constraint $E(\hat{I}_k) = i$.

Exemplary teachings on finding optimal weights using predefined conditions can be found in the previously referenced and incorporated Applicants' publication, "Photocurrent Estimation from Multiple Non-Destructive Samples in a CMOS Image Sensor".

The optimal estimate $\hat{I}_k$ in this case can be cast in a recursive form. For example, define a set of weights as $b_j$, such that $$b_1 = 1, \quad (6)$$

$$b_j = jb_1 + \frac{j}{j-1} b_{j-1} + \frac{j\sigma_U^2}{\sigma_V^2} \left( \sum_{l=1}^{j-1} \frac{b_l}{l} \right) \text{ for } j \ge 2.$$

Accordingly, $a_j^{(k)}$ can be represented in terms of $b_j$ such that $$a_j^{(k)} = \frac{b_j}{\sum_{l=1}^{k} b_l} \text{ for } 1 \le j \le k.$$

As such, the optimal photocurrent estimate $\hat{I}_k$ can be written in a recursive form in terms of $b_k$, the latest photocurrent sample $\tilde{I}_k$, and the previous estimate $\hat{I}_{k-1}$ as $$\hat{I}_k = \hat{I}_{k-1} + h_k(\tilde{I}_k - \hat{I}_{k-1}), \quad (7)$$

where $$h_k = \frac{b_k}{g_k} \text{ and } g_k = \sum_{l=1}^{k} b_l.$$

The MSE can also be expressed in a recursive form such that $$\Phi_k^2 = \frac{g_{k-1}^2}{g_k^2} \Phi_{k-1}^2 + \frac{1}{g_k^2} \left( (2b_k g_{k-1} + b_k^2) \frac{\sigma_U^2}{k\tau^2} + b_k^2 \frac{\sigma_V^2}{(k\tau)^2} \right) \quad (8)$$

This is important because the MSE is also used in the novel motion/saturation detection algorithm described herein.

The initial conditions for computing the estimate and its MSE are as follows: $b_1=1$; approximate the first estimator $\hat{I}_1$ by $\tilde{I}_1$ and $$\Phi_1^2 = \frac{\sigma_U^2}{\tau^2} + \frac{\sigma_V^2}{\tau^2}.$$

To compute the estimate $\hat{I}_{k+1}$ and the MSE $\Phi_{k+1}^2$, one needs to know $\sigma_U^2 = qi\tau$, which means that one needs to know the parameter i. In equations (6) and (8), $\sigma_U^2 = qi\tau$ is approximated using the latest estimate of i, $\hat{I}_k$, i.e., $\sigma_U^2 = q\hat{I}_k\tau$. This approximation yields a MSE that is very close to the optimal case, i.e., when i is known.

Estimation for Scenario (2)—A Non-Recursive Solution

Taking reset noise and offset FPN into consideration, $\tilde{I}_k$ is redefined as $$\tilde{I}_k = \frac{Q_k - wQ_0}{k\tau}, \text{ for } 1 \le k \le n. \quad (9)$$

The weight w is obtained by solving for the optimal $b_0$ in equation (4), which yields $$w = \frac{\sigma_C^2}{\sigma_C^2 + \sigma_V^2}.$$

Note that $\tilde{I}_k$ corresponds to an estimate with a weighted correlated double sampling (CDS) operation. The weighting has the effect of reducing the additional readout noise due to CDS.

The pixel current estimate $\hat{I}_k$, given the first k samples, can be expressed as $\hat{I}_k = A_k \tilde{I}_k$, where optimal coefficient vector $A^k = [a_1^{(k)} a_2^{(k)} \ldots a_k^{(k)}]$ and photocurrent sample vector $\tilde{I}_k = [\tilde{I}_1 \tilde{I}_2 \ldots \tilde{I}_k]^T$. Note that since this estimation algorithm cannot be expressed in a recursive form, finding the optimal current estimate $\hat{I}_k$ requires the storage of the the optimal current estimate $\hat{I}_k$ requires the storage of the vector $\tilde{I}_k$ and inverting a k×k matrix. Exemplary teachings on solving such matrices and finding Lagrange multiplier for the linear constraint can be found in the previously referenced and incorporated Applicants' publication, "Photocurrent Estimation from Multiple Non-Destructive Samples in a CMOS Image Sensor".

Estimation for Scenario (3)—A Suboptimal Recursive Solution

Taking the reset noise and FPN into consideration, a suboptimal recursive estimation, i.e., without the need to store all samples, will now be described. This estimation solution utilizes the recursive optimal photocurrent estimate of the first scenario, i.e., $$\hat{I}_k = \hat{I}_{k-1} + h_k(\tilde{I}_k - \hat{I}_{k-1}), \quad (7)$$

and the redefined pixel current samples of the second scenario, i.e., $$\tilde{I}_k = \frac{Q_k - wQ_0}{k\tau}, \text{ for } 1 \leq k \leq n. \quad (9)$$

The coefficient $h_k$ can be found by solving the equations $$\frac{d\Phi_k^2}{dh_k} = \frac{dE(\hat{I}_k - i)^2}{dh_k} = 0 \quad (10)$$

and $E\hat{I}_k = i$.

Define the MSE of $\tilde{I}_k$ as $$\Delta_k^2 = E(\tilde{I}_k - i)^2 = \frac{1}{k^2\tau^2}(k\sigma_U^2 + (1+w)\sigma_V^2) \quad (11)$$

and the covariance between $\tilde{I}_k$ and $\hat{I}_k$ as $$\Theta_k = E(\tilde{I}_k - i)(\hat{I}_k - i) = (1 - h_k)\frac{k-1}{k}\Theta_{k-1} - \frac{(1-h_k)h_{k-1}}{k(k-1)\tau^2}\sigma_V^2 + h_k\Delta_k^2. \quad (12)$$

The MSE of $\hat{I}_k$ can be expressed in terms of $\Delta_k^2$ and $\Theta_k$ as $$\Phi_k^2 = (1-h_k)^2\Phi_{k-1}^2 + \frac{2(k-1)(1-h_k)h_k}{k}\Theta_{k-1} - \frac{2h_{k-1}(1-h_k)h_k}{k(k-1)\tau^2}\sigma_V^2 + h_k^2\Delta_k^2. \quad (13)$$

To minimize the MSE, $d\Phi_k^2/dh_k = 0$ is required, which gives $$h_k = \frac{\Phi_{k-1}^2 - \frac{(k-1)}{k}\Theta_{k-1} + \frac{h_{k-1}\sigma_V^2}{k(k-1)\tau^2}}{\Phi_{k-1}^2 - \frac{2(k-1)}{k}\Theta_{k-1} + \frac{2h_{k-1}\sigma_V^2}{k(k-1)\tau^2} + \Delta_k^2} \quad (14)$$

Note that $h_k$, $\Theta_k$ and $\Phi_k$ can all be recursively updated. For example, at each iteration, $$\Phi_k^2 = (1-h_k)^2\Phi_{k-1}^2 + 2h_k\Theta_k - h_k^2\Delta_k^2.$$

With this suboptimal recursive algorithm, only the old estimate $\hat{I}_{k-1}$, the new sample value $\tilde{I}_k$, and three parameters, $h_k$, $\Theta_k$ and $\Phi_k$, are needed in order to find the new estimate $\hat{I}_k$. Thus, only a small amount of memory per pixel is required and the amount of pixel memory required is advantageously independent of the number of images captured.

Figure 5:
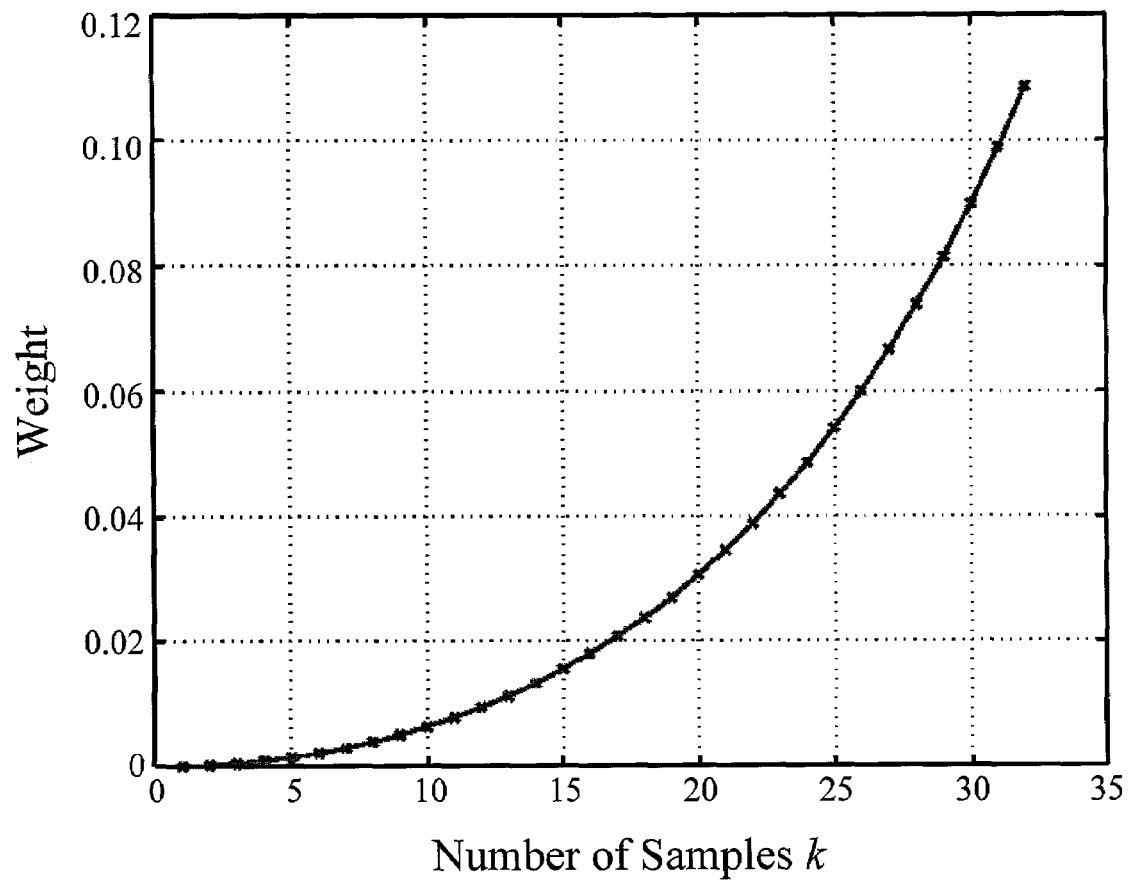
FIG. 5 is a diagram showing estimation weights used in the recursive embodiment of the present invention.
Figure 6:
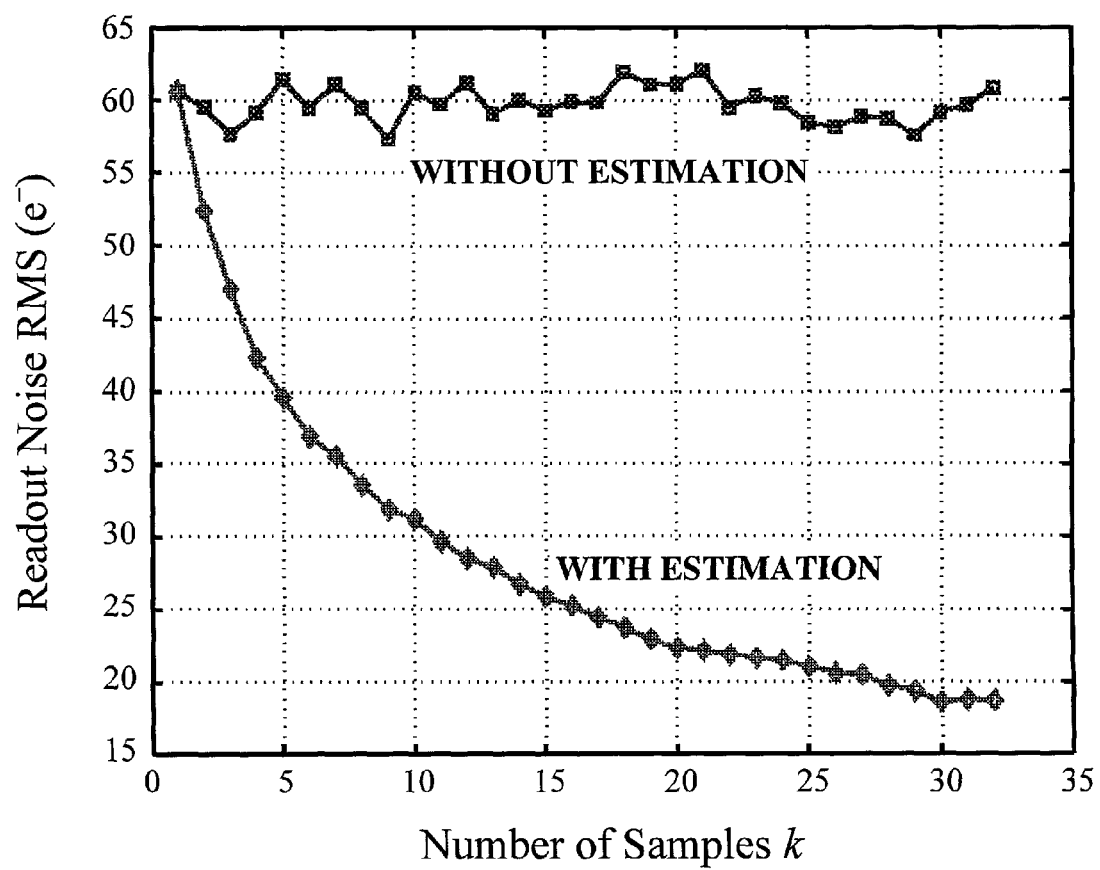
FIG. 6 is a diagram showing equivalent readout noise versus number of samples according to various embodiments of the present invention.

The advantages such as improved SNR offered by the novel estimation algorithms can be further demonstrated with reference to FIGS. 5 and 6 where the following sensor parameters are used.

$Q_{sat} = 18750$ e−
$i_{dc} = 0.1$ fA
$\sigma_V = 60$ e−
$\sigma_C = 62$ e−
T = 32 ms
τ = 1 ms FIG. 5 plots the estimation weights used in the recursive estimation algorithm. The relationship between the number of samples k captured and the estimation weights as shown in FIG. 5 can be easily understood by one of ordinary skill in the art and thus is not described in details herein. FIG. 6 compares the equivalent readout noise (RMS) and SNR values at low illumination level corresponding to $i_{ph} = 2$ fA as a function of the number of samples k for conventional sensor operation, i.e., no estimation, and using the recursive estimation algorithm described herein. As can be seen in FIG. 6, the equivalent readout noise after the last sample is reduced from 60 e−, when no estimation is used, to 18 e−, when the recursive estimator is used.

Figure 7:
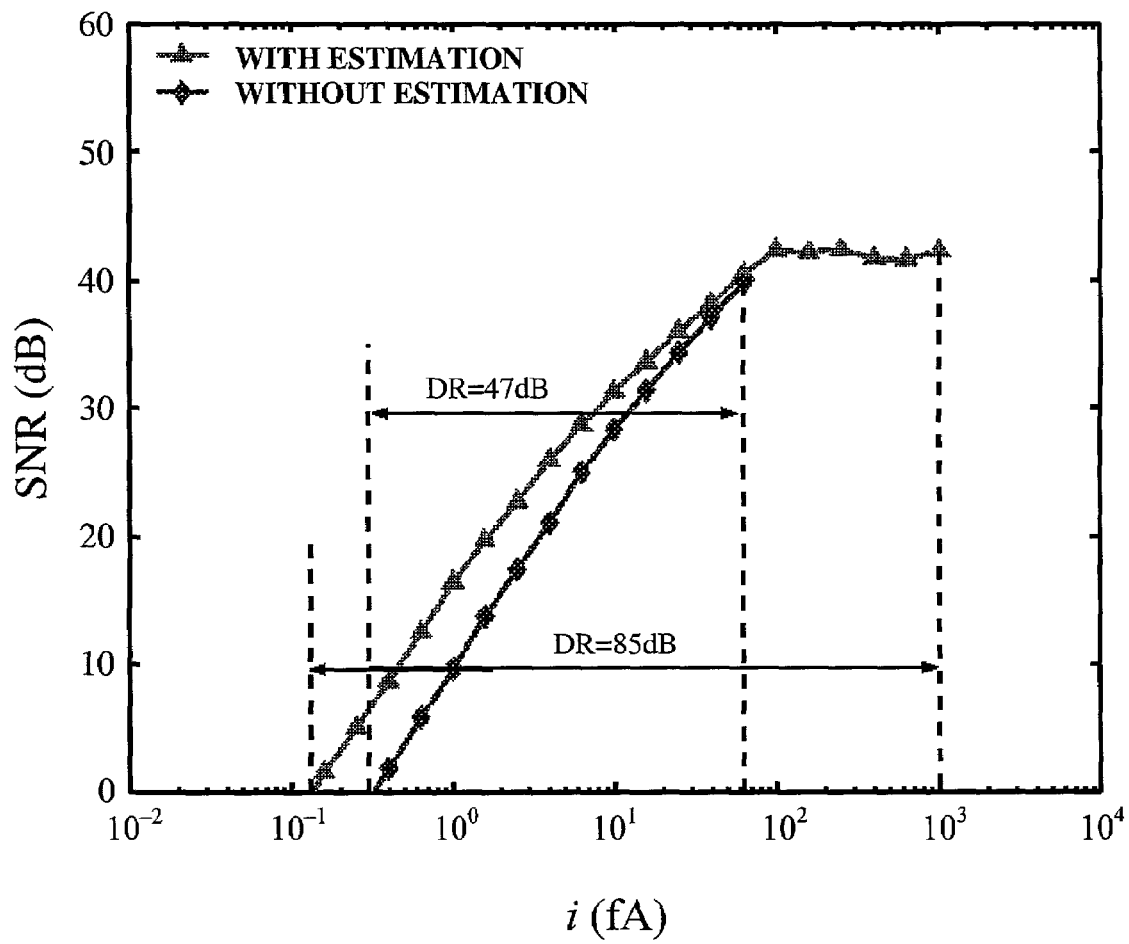
FIG. 7 is a diagram showing soft decision motion detection according to yet another embodiment of the present invention.

Advantages of the present invention including simultaneous SNR and dynamic range enhancement utilizing the inventive estimation system described herein can be seen in FIG. 7, especially when compared to conventional sensor operation where the last sample $\tilde{I}_n$ is used.

FIG. 7 shows that SNR in an image sensor system that utilizes the inventive estimation system is consistently higher, due to the reduction in read noise. Such improvement is most pronounced at the low illumination end, i.e., under low light. More significantly, the sensor dynamic range, defined as the ratio of the largest signal $i_{max}$ to the smallest detectable signal $i_{min}$, is increased compared to the convention sensor operation.

For example, assume in a conventional sensor operation $i_{max} = Q_{sat}/T$ and $i_{min} = \sigma v/T$, where sensor parameters $Q_{sat} = 18750$ e−; $\sigma v = 60$e−; T = 32 ms; and sample number n = 32. This yields a dynamic range of 47.4 dB. With the inventive estimation system, on the other hand, the dynamic range is advantageously extended to 85.5 dB—increasing 30.1 dB at the high illumination end and 8 dB at the low illumination end.

According to these described principles of the present invention, provided are the following embodiments:

1. An optimal recursive algorithm when reset noise and offset fixed pattern noise (FPN) are ignored. In this case, since the reset noise and FPN are ignored, the estimation algorithm can be cast in a recursive form, which, in turn, minimizes pixel storage required for the corresponding operation. That is, only the latest estimate and the new sample are needed to update the pixel photocurrent estimate. This estimation solution is well suited for, but not limited to, high-end CCD's using very high resolution ADC.

2. An optimal non-recursive algorithm when reset noise and FPN are considered. In this case, the estimation solution cannot be expressed in a recursive form. Accordingly, this estimation solution is well suited for, but not limited to, applications with reduction/elimination of readout noise and FPN being the main focus.

3. A suboptimal recursive estimator for the non-recursive algorithm. In this case, the reset noise and FPN are considered and the corresponding estimation solution can be cast in a recursive form. As described herein, the suboptimal recursive estimator yields mean square error close to the non-recursive algorithm without the need to store all the samples, requiring the storage of only a constant number of values per pixel. Furthermore, the pixel storage requirement can be independent of the number of image sample captured. As such, the suboptimal recursive estimator offers at least the following advantages: improved SNR and independent minimal pixel storage requirement.

Motion/Saturation Detection

The derivation of the recursive linear estimation algorithms operates advantageously when no motion blur or saturation occurs. That is, when i(t) is constant and saturation does not occur before $k\tau$. Blurring due to object or camera motion during image capture can cause substantial degradation in image quality. To further enhance the quality of the image captured, the present invention provides a novel motion/saturation detection algorithm for updating the photocurrent estimate when motion blur is detected and/or saturation has occurred.

A great deal of research has been conducted on developing methods for restoring blurred images. An exemplary teaching on digital image restoration can be found in "Digital image restoration" by Banham et al. These methods make certain assumptions on the blurring process, the ideal image, and the noise. Various image processing techniques are then used to identify the blur and restore the image. However, due to the lack of sufficient knowledge of the blurring process and the ideal image, these known and developed image blur restoration methods have limited applicability and their computational burden can be quite substantial.

Without a complete knowledge of the statistics of the noise and specified motion model, it is not possible to derive an absolutely optimal detection algorithm. However, as previously described, particularly with reference to FIGS. 3 and 6, the present invention provides a best possible solution by performing the motion/saturation detection step prior to each estimation step, as shown and described with reference to FIG. 4, thereby forming a blur free high dynamic range image from the n+1 captured images, taking into consideration the tradeoffs between motion induced distortion and SNR improvement due to increased exposure time.

The novel motion/saturation detection algorithm operates on each pixel separately. After the kth capture, the best MSE linear estimate of i, $\hat{I}_k$, and its MSE, $\Phi_k^2$, are computed as previously described with reference to the suboptimal recursive algorithm. If the current stays constant, the next observation $$\tilde{I}_{k+1}^{pre}$$

would be $$\tilde{I}_{k+1}^{per} = i + \frac{\sum_{j=1}^{k+1} U_j}{(k+1)\tau} + \frac{V_{k+1} - wV_0}{(k+1)\tau} + \frac{(1-w)C}{(k+1)\tau} \quad (15)$$

and the best predictor of $$\tilde{I}_{k+1}^{pre}$$

is $\hat{I}_k$ with the prediction MSE given by $$\Delta_{per}^2 = E((\tilde{I}_{k+1}^{per} - \hat{I}_k)^2 \mid \hat{I}_k) \quad (16)$$

$$= \left(\frac{k}{k+1}\right)^2 \Delta_k^2 + \Phi_k^2 - \frac{2k}{k+1}\Theta_k + \frac{2h_k}{k(k+1)\tau^2}\sigma_V^2 + \frac{\sigma_U^2}{(k+1)\tau^2}$$

where $\Delta_k^2$, $\Theta_k$, $\Phi_k^2$, and $h_k$ are given in equation (11), (12), (13), (14), respectively.

Thus, whether the input signal i changed between time $k\tau$ and $(k+1)\tau$ can be determined by comparing $$\tilde{I}_{k+1} = \frac{Q_{k+1} - wQ_0}{(k+1)\tau}$$

with $\hat{I}_k$. A simple decision rule would be to declare that motion has occurred if $$|\tilde{I}_{k+1} - \hat{I}_k| \geq m\Delta_{pre}, \quad (17)$$

and to use $\hat{I}_k$ as the final estimate of i, otherwise to use $\tilde{I}_{k+1}$ to update the estimate of i, i.e., $\hat{I}_{k+1}$.

For further details on respective mathematical models and corresponding calculations, readers are referred to Applicants' publication, "Simultaneous Image Formation and Motion Blur Restoration via Multiple Capture", Proc. of ICASSP2001, Salt Lake City, May 2001, the publication of which is hereby expressly incorporated herein by reference in its entirety.

The constant m>0 is chosen to achieve the desired tradeoff between SNR improvement and motion blur. The higher m the more motion blur if i changes with time, but also the higher the SNR if i is a constant, and vice versa. One potential problem with this "hard" decision rule is that gradual drift in i can cause accumulation of estimation error resulting in undesired motion blur. Therefore, in a preferred embodiment, the present invention utilizes a novel "soft" decision rule.

Motion Detection Algorithm with Soft Decision Rule

In a preferred embodiment with high frame rate capture, the algorithm described herein employs a recursive "soft decision" algorithm to detect change in each pixel's signal due to motion or change in illumination. The decision to stop estimating after motion is detected is made locally and is independent of other pixel's signals.

Figure 8:
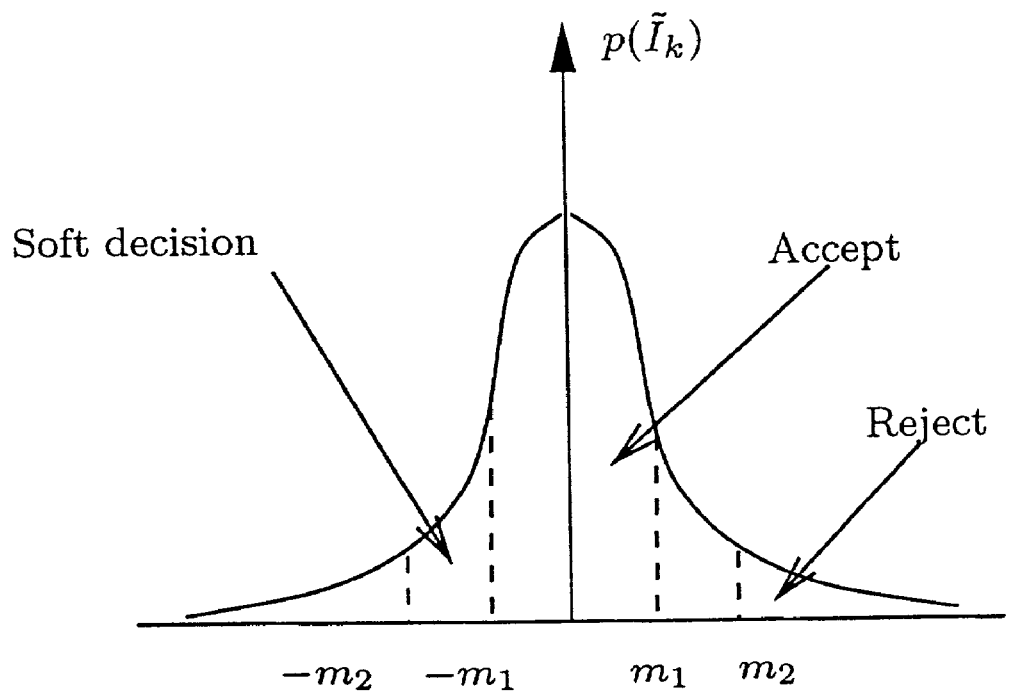
FIG. 8 is a diagram showing optimal integration time under motion according to the principles of the present invention.

With reference to FIG. 8, a soft decision motion detection algorithm according to an aspect of the present invention will now be described.

For each pixel, after the (k+1)st capture:
1. If $|\tilde{I}_{k+1} - \hat{I}_k| \leq m_1 \Delta_{pre}$, then declare that no motion detected. Use $\tilde{I}_{k+1}$ to update $\hat{I}_{k+1}$ and set $L^+=0$, $L^-=0$.
2. If $|\tilde{I}_{k+1} - \hat{I}_k| \geq m_2 \Delta_{pre}$, $L^+=l_{max}$, or $L^-=l_{max}$, then declare that motion detected. Use $\hat{I}_k$ as the final estimate of i.
3. If $m_1 \Delta_{pre} < \tilde{I}_{k+1} - \hat{I}_k < m_2 \Delta_{pre}$, then defer the decision and set $L^+=L^++1$, $L^-=0$.
4. If $-m_2 \Delta_{pre} < \tilde{I}_{k+1} - \hat{I}_k < -m_1 \Delta_{pre}$, then defer the decision and set $L^-=L^-+1$, $L^+=0$.

The counters, $L^+$ and $L^-$, record the number of times the decision is deferred, and $0<m_1<m_2$ and $l_{max}$ are chosen so to achieve a desirable balance between the highest possible SNR and the least possible motion blur.

Figure 9:
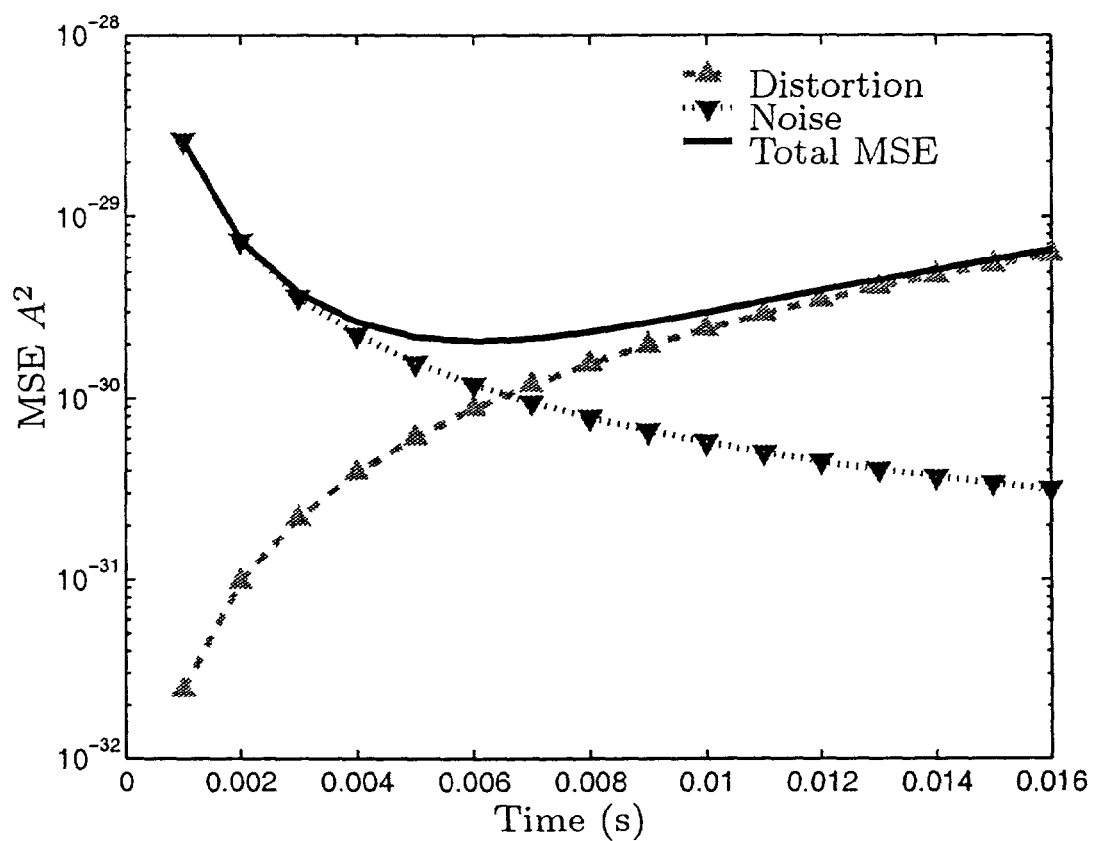
FIG. 9 is a diagram showing SNR and dynamic range being enhanced in accordance with an embodiment of the present invention.

To demonstrate such tradeoff between the SNR and motion blur distortion, turn now to FIG. 9 where optimal integration time under motion is illustrated. Consider a linearly varying photocurrent $$i(t)=i_0(1+\rho t) \tag{18}$$

where $i_0=i(0)$ is the photocurrent at the beginning of exposure, $0 \leq t \leq T$ is time during exposure, and $\rho \geq -1/T$ is the rate of photocurrent change. In a simplified analysis, assume that photocurrent is estimated by the most recent sample $\tilde{I}_k$. In this case, the MSE can be expressed as the sum of two components $$MSE = \Delta_1^2 + \Delta_2^2,$$

where $$\Delta_1^2 = \left(\frac{1}{2}\rho i_0 t\right)^2,$$

is the MSE due to motion distortion and $$\Delta_2^2 = \frac{\sigma_V^2}{t^2} + \frac{qi_0}{t} + \frac{1}{2}q\rho i_0,$$

is the estimation MSE. As can be seen in FIG. 9, $\Delta_1^2$ increases with time, since the deviation from constant current due to motion increases with t, while $\Delta_2^2$ decreases with time, since estimation becomes more accurate as t increases. The parameters, $m_1$, $m_2$, $L^+$, and $L^-$, of the present invention can be set to achieve desired tradeoff between SNR and motion blur distortion.

Figure 10:
FIG. 10 shows an example of motion blur elimination achieved with an embodiment of the present invention were (a) shows a first position of a dancer at start of an exposure time, (b) shows a second position of the dancer at end of the exposure time, (c) is a final image generated by a conventional sensor, and (d) is a final image generated in accordance with the teachings of the present invention.
Figure 10:
Figure 10:
Figure 10:

FIG. 10 further demonstrates the advantages of the present invention such as simultaneous SNR and dynamic range improvement with multiple captures without motion blur. FIG. 10 shows an example of motion blur prevention with a rapid movement in the scene. Images (a) and (b) show respective positions of a dancer at the beginning and end of an exposure time. Image (c) illustrates a final image generated by a conventional sensor with normal exposure time. Image (d) comparably illustrates a final image generated by a sensor utilizing the present invention. As shown in FIG. 10, by applying the inventive algorithms described herein the image blur in (c) is almost completely eliminated in (d).

Figure 11:
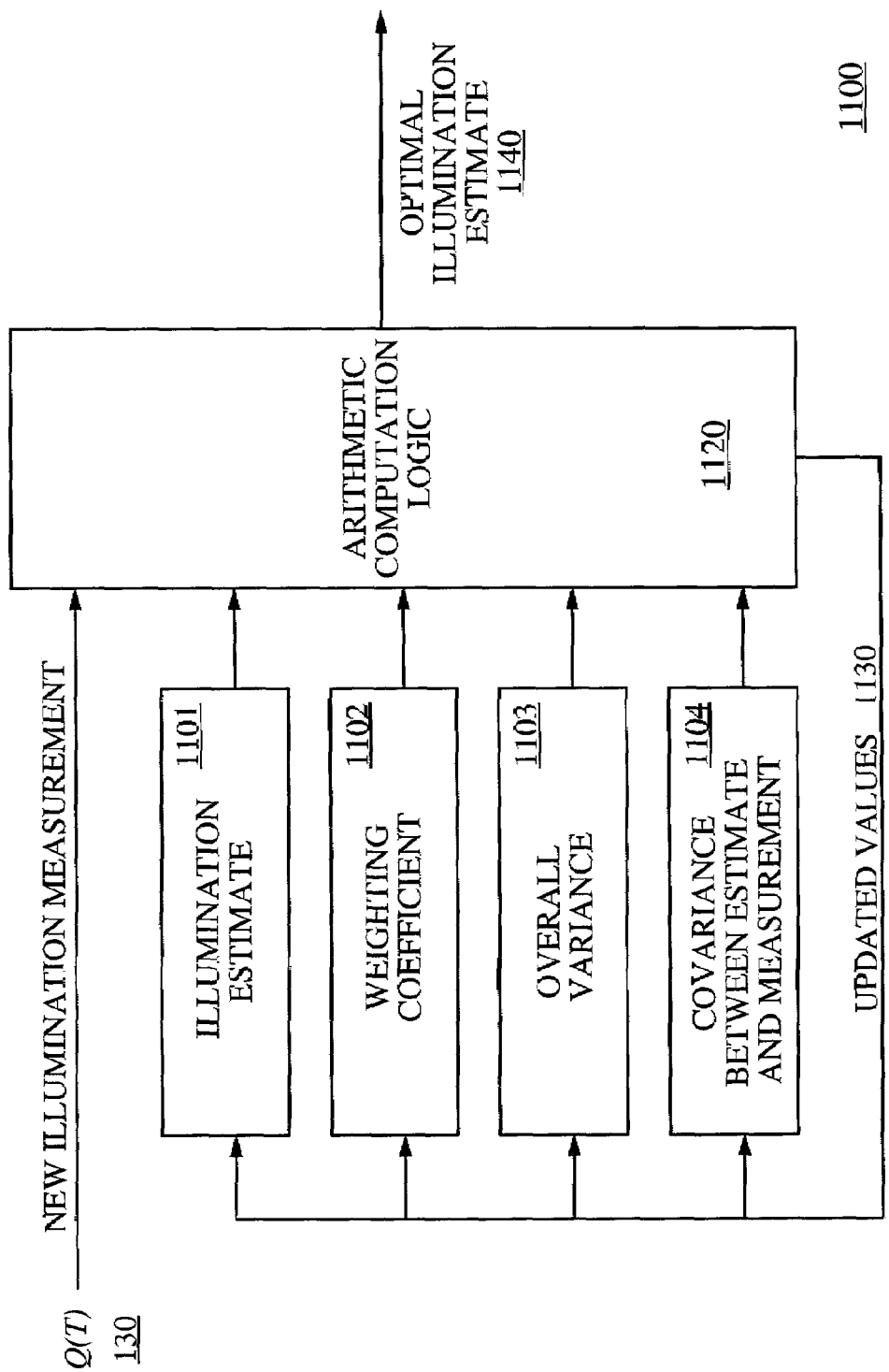
FIG. 11 shows an exemplary recursive estimation system according to an aspect of the present invention.

Turning to FIG. 11, where a recursive estimation system according to an embodiment of the present invention will now be described. In FIG. 11, a recursive estimation system 1100 recursively estimates the intensity of the illumination on a sensor by digitally latching pixel current (charge) Q(T) 130 or holding it as an analog voltage value. Similarly, recursive estimation system 1100 latches or holds photocurrent estimate 1101, weighting coefficient 1102, overall photocurrent variability 1103 and last sample photocurrent variability 1104.

Synchronously with the assertion of a reset signal, initial values for photocurrent estimate 1101, weighting coefficient 1102, overall photocurrent variability 1103 and last sample photocurrent variability 1104 are latched or held. In an embodiment of the invention, these initial values may depend on calibration parameters of an associated sensor array. In another embodiments of the invention, these initial values may depend on user preferences or settings that indicate the type of image being captured.

Operations of the recursive estimation system 1100 will now be described with reference to FIGS. 1 and 11. As previously described, FIG. 1 shows a conventional 2D sensor array 110 with pixel circuit 120. Integrating with the recursive estimation system 1100, after the assertion of the reset signal ends and before the accumulation of any charge, the voltage on capacitor 122 is measured. This initial measurement is used as the initial value of charge Q(T) 130.

When a new charge Q(T) 130 becomes available from the readout circuit 125, an arithmetic computation logic 1120 first perform motion/saturation detection. If no motion/saturation is detected based on this new charge Q(T) 130 and the previous values of pixel current estimate 1101, weighting coefficient 1102, overall photocurrent variability 1103 and last sample photocurrent variability 1104, the updated value 1130 is then calculated. These previous values, i.e., photocurrent estimate 1101, weighting coefficient 1102, overall photocurrent variability 1103 and last sample photocurrent variability 1104, are then replaced by the updated values 1130. If motion/saturation is detected, then the previous values are not updated. This process is recursively repeated for each capture within exposure time T. At the end of exposure time T, the arithmetic computation logic 1120 outputs photocurrent estimate 1101 as final photocurrent estimate 1140.

In sum, the photocurrent estimation according to an aspect of the present invention reduces read noise and thus enhances dynamic range at low illumination end. The motion/saturation detection according to another aspect of the present invention enhances dynamic range at the high illumination end. The inventive motion/saturation detection further ensures that the estimation is not corrupted by motion. As previously described, recent advances in CMOS image sensor technology enable digital high speed capture up to thousands of frames per second, enabling new imaging enhancement capabilities such as multiple sampling (multiple captures) for increasing the sensor dynamic range. The present invention further strengthens such multiple sampling capability in CMOS image sensors by providing apparatuses, systems, and methods for synthesizing high dynamic range, low or no noise, motion blur free images even under low illumination and/or with extended exposure time.

Furthermore, the present invention operates completely locally, i.e., each image pixel's final value is computed using only its captured values, and recursively, requiring only a constant number of values per pixel be stored. The storage requirement is thus small and independent of the number of images captured. These modest computation and storage requirements make the present invention well suited for single chip digital camera implementations.

It will be obvious to one skilled in the art that the present invention, including the non-recursive estimation, recursive estimation, suboptimal recursive estimation motion/saturation detection, soft decision rule, and high dynamic motion blur free image synthesis from multiple captures, along with respectively associated variables, parameters, values and circuitry designs, described in various embodiments of the present invention, may be implemented, calibrated and/or fabricated in various hardware and software implementations without departing from the principles, spirit, or scope of the present invention.

For example, either a non-recursive estimation system or a recursive estimation system such as the recursive estimation system 1100 may implement the computations needed based on analog approximations, digital approximations, estimators and heuristics, so as to reduce the size and complexity of the circuits involved and/or required, to speed up associated sensor operation, or both. In addition, some embodiments of the present invention may be integrated at pixel level, column level, or chip level. Furthermore, some aspects of the present invention may be integrated with a CCD or a CMOS image sensor system. In particular, the present invention may be advantageously implemented in a novel CMOS DPS image sensor system with self-reset pixel architecture as disclosed in Applicants' cross-referenced U.S. patent applications, titled "CMOS Image Sensor System with Self-Reset Digital Pixel Architecture for Improving SNR and Dynamic Range" and "Method for Improving SNR in Low Illumination Conditions in a CMOS Video Sensor System Using a Self-Resetting Digital Pixel".

Although the present invention and its advantages have been described in detail, it should be understood that the resent invention is not limited to or defined by what is shown or discussed herein; rather, the invention may be practiced with the specific details herein omitted or altered. The drawings, description and discussion herein illustrate technologies related to the invention, show examples of the invention and provide examples of using the invention. Known methods, procedures, systems, circuits or components may be discussed or illustrated without giving details, so as to avoid obscuring the principles of the invention. One skilled in the art will realize that changes, substitutions, and alternations could be made in numerous implementations, modifications, variations, selections among alternatives, changes in form, and improvements without departing from the principles, spirit or legal scope of the invention. Accordingly, the scope of the present invention should be determined by the following claims and their legal equivalents.

We claim:

1. An estimation method for recursively estimating an optimal illumination on a sensor capable of capturing non-destructively a plurality of image samples during an exposure period, said method comprising:

measuring an illumination indication from said sensor, said measuring occurs two or more times at intervals during said exposure period, producing a multiplicity of measurements;

determining an estimated illumination on said sensor from all or essentially all of said multiplicity of measurements non-destructively captured before motion/saturation, said determining step occurring recursively over said multiplicity of measurements and including statistical signal processing of said multiplicity of measurements, said signal processing being based on a noise model selected from a fixed pattern noise model, a reset noise model, a shot noise model and a read noise model; and maintaining a plurality of parameters during said measuring step, said plurality of parameters comprising:
   said estimated illumination;
   a weighting coefficient of a particular one of said multiplicity of measurements;
   a variance between said particular one of said multiplicity of measurements and said multiplicity of measurements; and
   an overall variance of said multiplicity of measurements.

2. The estimation method of claim 1, wherein said sensor is a photodiode and said illumination indication is a charge accumulated from photocurrent produced by said photodiode.

3. The estimation method of claim 1, wherein said measuring occurs non-destructively and said charge accumulates over said exposure period.

4. The estimation method of claim 1, wherein said determining includes statistical signal processing of said multiplicity of measurements, said signal processing being based on maximizing a likelihood of accuracy of said estimated illumination.

5. The estimation method of claim 1, wherein said determining includes statistical signal processing of said multiplicity of measurements, said signal processing being based on minimizing an error of said estimated illumination.

6. The estimation method of claim 1, wherein said determining includes statistical signal processing of said multiplicity of measurements, said signal processing being based on minimizing a linear mean square error of said estimated illumination.

7. The estimation method of claim 1, wherein said sensor is configured in a sensor array, a pixel sensor in a digital camera, a pixel sensor in a video camera, a pixel sensor in a stereo digital camera or a pixel sensor in a stereo video camera.

8. An estimation method for recursively estimating an optimal illumination on a sensor capable of capturing non-destructively a plurality of image samples during an exposure period, said method comprising:

measuring an illumination indication from said sensor, said measuring occurs two or more times at intervals during said exposure period, producing a multiplicity of measurements;

determining an estimated illumination on said sensor from all or essentially all of said multiplicity of measurements non-destructively captured before motion/saturation, said determining step occurring recursively over said multiplicity of measurements and including statistical signal processing of said multiplicity of measurements, said signal processing being based on a noise model selected from a fixed pattern noise model, a reset noise model, a shot noise model and a read noise model; and maintaining a plurality of parameters during said measuring step, said plurality of parameters comprising:
   said estimated illumination;
   a weighting coefficient applied to a difference between a present one of said multiplicity of measurements and said estimated illumination corresponding to a previous one of said multiplicity of measurements;
   a mean square error of said estimated illumination; and
   a covariance of said estimated illumination with said present one of said multiplicity of measurements.

9. The estimation method of claim 8, wherein said sensor is a photodiode and said illumination indication is a charge accumulated from photocurrent produced by said photodiode.

10. The estimation method of claim 8, wherein said measuring step occurs non-destructively and said charge accumulates over said exposure period.

11. The estimation method of claim 8, wherein said determining includes statistical signal processing of said multiplicity of measurements, said signal processing being based on maximizing a likelihood of accuracy of said estimated illumination.

12. The estimation method of claim 8, wherein said determining includes statistical signal processing of said multiplicity of measurements, said signal processing being based on minimizing an error of said estimated illumination.

13. The estimation method of claim 8, wherein said determining includes statistical signal processing of said multiplicity of measurements, said signal processing being based on minimizing a linear mean square error of said estimated illumination.

14. The estimation method of claim 8, wherein said sensor is configured in a sensor array, a pixel sensor in a digital camera, a pixel sensor in a video camera, a pixel sensor in a stereo digital camera or a pixel sensor in a stereo video camera.

15. An apparatus configured to estimate illumination on a sensor during an exposure period, said apparatus comprising:
   a sampling means configured to measure, at a multiplicity of time intervals during said exposure period, an illumination indication from said sensor, and configured to produce a multiplicity of measurements; and
   an estimation means configured to determine an estimated illumination on said sensor from said multiplicity of measurements, said estimation means being configured to compute recursively over said multiplicity of measurements and to maintain recursively a plurality of parameters over said multiplicity of measurements, said plurality of parameters comprising:
   said estimated illumination;
   a weighting coefficient of a particular one of said multiplicity of measurements;
   a variance between said particular one of said multiplicity of measurements and said multiplicity of measurements; and
   an overall variance of said multiplicity of measurements.

16. The apparatus of claim 15, wherein said sensor is implemented in a sensor array, a pixel sensor in a single chip imaging device, a pixel sensor in a digital camera, a pixel sensor in a video camera, a pixel sensor in a stereo digital camera or a pixel sensor in a stereo video camera.

17. The apparatus of claim 15, wherein said sensor is a photodiode and said illumination indication is a charge accumulated from photocurrent produced by said photodiode.

18. The apparatus of claim 15, wherein said sampling means operates non-destructively and said charge accumulates over said exposure period.

19. The apparatus of claim 15, wherein said estimation means can perform statistical signal processing of said multiplicity of measurements, said signal processing being based on a noise model selected from a fixed pattern noise model, a reset noise model, a shot noise model and a read noise model.

20. The apparatus of claim 15, wherein said estimation means can perform statistical signal processing of said multiplicity of measurements, said signal processing being based on maximizing a likelihood of accuracy of said estimated illumination.

21. The apparatus of claim 15, wherein said estimation means can perform statistical signal processing of said multiplicity of measurements, said signal processing being based on minimizing an error of said estimated illumination.

22. The apparatus of claim 15, wherein said estimation means can perform statistical signal processing of said multiplicity of measurements, said signal processing being based on minimizing a linear mean square error of said estimated illumination.

23. An apparatus configured to estimate illumination on a sensor during an exposure period, said apparatus comprising:
   a sampling means configured to measure, at a multiplicity of time intervals during said exposure period, an illumination indication from said sensor, and configured to produce a multiplicity of measurements; and
   an estimation means configured to determine an estimated illumination on said sensor from said multiplicity of measurements, wherein said estimation means is configured to perform statistical signal processing of said multiplicity of measurements, said signal processing being based on a noise model selected from a fixed pattern noise model, a reset noise model, a shot noise model and a read noise model, and wherein said estimation means is configured to compute recursively over said multiplicity of measurements and to maintain recursively a plurality of parameters over said multiplicity of measurements, said plurality of parameters comprising:
   said estimated illumination;
   a weighting coefficient applied to a difference between a present one of said multiplicity of measurements and said estimated illumination corresponding to a previous one of said multiplicity of measurements;
   a mean square error of said estimated illumination; and
   a covariance of said estimated illumination with said present one of said multiplicity of measurements.

24. The apparatus of claim 23, wherein said sensor is implemented in a sensor array, a pixel sensor in a single chip imaging device, a pixel sensor in a digital camera, a pixel sensor in a video camera, a pixel sensor in a stereo digital camera or a pixel sensor in a stereo video camera.

25. The apparatus of claim 23, wherein said sensor is a photodiode and said illumination indication is a charge accumulated from photocurrent produced by said photodiode.

26. The apparatus of claim 23, wherein said sampling means operates non-destructively and said charge accumulates over said exposure period.

27. The apparatus of claim 23, wherein said estimation means can perform statistical signal processing of said multiplicity of measurements, said signal processing being based on a noise model selected from a fixed pattern noise model, a reset noise model, a shot noise model and a read noise model.

28. The apparatus of claim 23, wherein said estimation means can perform statistical signal processing of said multiplicity of measurements, said signal processing being based on maximizing a likelihood of accuracy of said estimated illumination.

29. The apparatus of claim 23, wherein said estimation means can perform statistical signal processing of said multiplicity of measurements, said signal processing being based on minimizing an error of said estimated illumination.

30. The apparatus of claim 23, wherein said estimation means can perform statistical signal processing of said multiplicity of measurements, said signal processing being based on minimizing a linear mean square error of said estimated illumination.

* * * * *